US006660679B2

(12) United States Patent
Holtcamp et al.

(10) Patent No.: US 6,660,679 B2
(45) Date of Patent: Dec. 9, 2003

(54) CATALYST SYSTEM AND ITS USE IN A POLYMERIZATION PROCESS

(75) Inventors: Matthew W. Holtcamp, Huffman, TX (US); Tan H. Pham, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/882,906

(22) Filed: Jun. 18, 2001

(65) Prior Publication Data

US 2003/0008985 A1 Jan. 9, 2003

(51) Int. Cl.[7] ............................. B01J 31/38; C08F 4/44
(52) U.S. Cl. ..................... 502/152; 502/103; 502/104; 502/117; 502/118; 526/133; 526/134; 526/159; 526/160
(58) Field of Search .................. 502/103, 104, 502/117, 118, 152; 526/133, 134, 159, 160

(56) References Cited

U.S. PATENT DOCUMENTS

| 5,763,549 A | 6/1998 | Elder et al. ................. 526/153 |
| 6,147,173 A | 11/2000 | Holtcamp .................... 526/133 |

FOREIGN PATENT DOCUMENTS

| WO | WO 99/06449 | 2/1999 |
| WO | WO 00/34344 | 6/2000 |

*Primary Examiner*—David W. Wu
*Assistant Examiner*—R. Harlan
(74) *Attorney, Agent, or Firm*—Lisa Kimes Jones; Kevin M. Faulkner

(57) ABSTRACT

Disclosed are polymerization catalyst activator complexes prepared from the reaction of a carbenium salt and Lewis base containing an aromatic group. Also disclosed are polymerization catalyst activator complexes prepared via the reaction of a Group 13 element containing salt including a Lewis base containing an aromatic group and a tritylhalide compound. Also disclosed are polymerization catalyst systems including the activator complex of the invention, and processes for polymerizing olefin(s) utilizing same.

32 Claims, No Drawings

CATALYST SYSTEM AND ITS USE IN A POLYMERIZATION PROCESS

FIELD OF THE INVENTION

The present invention relates to polymerization catalyst activator complexes, to methods of making these activator complexes, to polymerization catalyst systems containing these activator complexes, and to polymerization processes utilizing same. In one aspect, the present application relates to activator complexes prepared via the reaction of a carbenium salt and a Lewis base, preferably a nitrogen containing Lewis base, having an aromatic group. In another aspect, the present application relates to zwitterionic activator complexes prepared via the reaction of a Group 13 element containing salt including a Lewis base, preferably a nitrogen containing Lewis base, having an aromatic group, and a tritylhalide compound. In another aspect, the invention relates to catalyst systems containing these activator complexes, and to polymerization processes utilizing same.

BACKGROUND OF THE INVENTION

Polymerization catalyst compounds are typically combined with an activator (or co-catalyst) to yield compositions having a vacant coordination site that will coordinate, insert, and polymerize olefins. Typically, methyalumoxane (MAO) is utilized to activate metallocene catalysts. Alternative cocatalysts for metallocenes and other single-site polymerization catalysts have been discovered in recent years. European Patent Application 0 277 004 to Turner describes the reaction of tri(n-butylammonium) tetrakisperfluorophenylborate with methylated metallocenes yielding the activated metallocene salt [Cp$_2$ZrMe][B(C$_6$F$_5$)$_4$], methane and tributylamine.

It has been further shown that the choice of amine may affect polymer yields and the quality of the polymer produced. Alternative cations as part of these discrete activators have been explored. For example, the use of triphenylcarbenium tetrakisperfluorophenylaluminate to activate metallocenes in the presence of propylene was disclosed in U.S. Pat. No. 5,763,549. The use of the triphenylcarbenium cation results in an activated catalyst which avoids the presence of an amine. However, in some instances it is desirable to utilize ammonium cations as co-catalyst for practical industrial purposes such as improved solubility as well as in modifications of the polymer properties which weak bases may influence during a polymerization reaction.

U.S. Pat. No. 6,147,173 discloses that anions containing a nitrogen atom in the ring of the perfluorophenyborate activator results in polymers with enhanced molecular weights when compared with the perfluorophenyl borate anion.

WO 99/06449 discloses a zwitterionic catalyst activator including a protonated derivative of a Group 15 element having two hydrocarbyl substituents or having a positively charged derivative of a Group 14 element having three hydrocarbyl substituents.

SUMMARY OF THE INVENTION

It has been discovered that new polymerization catalyst activator complexes may be prepared via the reaction of 1) a carbenium salt and 2) a Lewis base containing an aromatic group. It has also been discovered that new zwitterionic activator complexes may be prepared via the reaction of 1) a Group 13 element containing salt including a Lewis base having an aromatic group, preferably a borate and aluminate salt including a Lewis base having an aromatic group, and 2) a tritylhalide compound.

DETAILED DESCRIPTION

The polymerization catalyst activators of the invention are complexes prepared by combining a Lewis base containing an aromatic group with a carbenium salt and complexes prepared by combining a Group 13 Element containing salt including a Lewis base containing an aromatic group and a trityl halide compound. The resulting complexes have been found to activate polymerization catalyst compounds.

For the purposes of this patent specification, the term "catalyst" refers to a metal compound that when combined with an activator polymerizes olefins, the term "catalyst system" refers to the combination of a catalyst and an activator, and the "activator" is used interchangeably with the term "co-catalyst."

Activator Compositions

In one embodiment, the activator complex of the invention is represented by the formula [LQ—H$^+$][MX$_4$]$^-$, which, in one embodiment, is prepared by combining a Lewis base containing an aromatic group and a carbenium salt as shown in Reaction I:

$$Q+L^+[MX_4]^- \rightarrow [LQ-H^+][MX_4]^- \qquad \text{Reaction (I)}$$

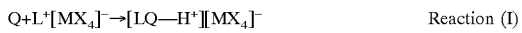

In Reaction I, Q is an aryl substituted neutral Lewis base, preferably an aryl substituted nitrogen, phosphorous, or sulfur containing Lewis base.

L$^+$ is a positively charged derivative of an element, selected from Group 14 of the Periodic Table of the Elements substituted with three hydrocarbyl substituents, with each substituent having from 1 to 50 carbon atoms. Preferably, L$^+$ is a stable carbenium ion containing up to 30 non-hydrogen atoms. In another embodiement L$^+$ is a stable silylium ion containing up to 30 non-hydrogen atoms. Suitable examples of L$^+$ include tropylium, triphenylmethylium, benzene(diazonium), triethylsilylium, trimethylsilylium and substituted adducts thereof. Preferably, L$^+$ is triphenyl carbenium.

M is an element selected from Group 13 of the Periodic Table of the Elements. Preferably M is boron or aluminum.

Each X is independently a hydride, a bridged or unbridged dialkylamido, a halide, an alkoxide, an aryloxide, a hydrocarbyl, substituted hydrocarbyl, halocarbyl, substituted halocarbyl, or a halosubstituted-hydrocarbyl radical. Each X having up to 20 carbon atoms with the proviso that in not more than one occurrence is X a halide. Preferably, each X is independently an aromatic or substituted aromatic hydrocarbon radical. Non-limiting examples of aromatic radicals include phenyl, napthyl and anthracenyl radicals. Suitable substituents on the substituted aromatic hydrocarbon radical include hydrocarbon, organometalloid, alkoxy, alkylamido, and halide radicals. Preferably, each X is a partially or fully fluorinated hydrocarbyl group having 1 to 20 carbon atoms, more preferably each X is a partially or fully fluorinated aryl group, napthyl group or biphenyl group, and most preferably a fluorinated phenyl group.

In one embodiment $[MX_4]^-$ is tetra(phenyl)borate, tetra(tolyl)borate, tetra(pentafluorophenyl)borate, tetra(dimethylphenyl)borate, tetra(pentafluorophenyl)aluminate, tetrafluoroaluminate and the like.

In another embodiment, the activator complex of the invention is represented by the formula $[(R''_3CC_6H_{n-1}R'_x)ZR_yH^+][MX_4]^-$, which, in one embodiment, is the product of a Lewis base containing an aromatic group and a carbenium salt as shown in Reaction II:

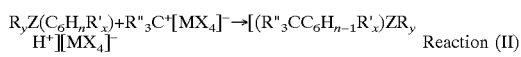

$R_yZ(C_6H_nR'_x) + R''_3C^+[MX_4]^- \rightarrow [(R''_3CC_6H_{n-1}R'_x)ZR_yH^+][MX_4]^-$  Reaction (II)

In Reaction II, Z is an element from Group 15 or 16 of the Periodic Table of the Elements. Preferably, Z is a Group 15 element or sulfur, more preferably Z is nitrogen, phosphorous or sulfur and most preferably Z is nitrogen.

Each R is independently hydrogen, a hydrocarbyl group, a hydroxyl group, an aryl group, or an alkyl group. Preferably each R is independently an alkyl group containing 1 to 50 carbon atoms, 1 to 20 carbon atoms or 1 to 6 carbon atoms.

Each R' is independently hydrogen, a hydrocarbyl group, a halogen, a heteroatom, or a heteroatom containing group.

Each R" is independently a hydrocarbyl group, or a substituted hydrocarbyl group. Preferably, each R" is an aryl substituted alkyl group, which may be substituted or unsubstituted. For example, R" may be a hydrocarbyl group substituted with halogens, hydrocarbyl groups, heteroatoms or heteroatom containing groups. More preferably, each R" is a phenyl group.

In one embodiment $R_yZ(C_6H_nR'_x)$ is a N,N-dialkylaniline compound, such as for example N,N-dimethylaniline, N,N-diethylaniline, N,N-2,4,6 pentamethylaniline, and the like.

y is an integer from 1 to 5.

x is an integer from 1 to 4.

x+n=5.

M and X and $[M_4]^-$ are as defined above in Reaction I.

In another embodiment, the activator complex of the invention is $[(R''_3CC_6H_{n-1}R'_x)NR_2H^+][MX_4]^-$ the product of a Lewis base containing an aromatic group and a carbenium salt as shown in Reaction III:

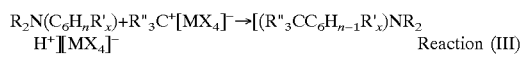

$R_2N(C_6H_nR'_x) + R''_3C^+[MX_4]^- \rightarrow [(R''_3CC_6H_{n-1}R'_x)NR_2H^+][MX_4]^-$  Reaction (III)

In Reaction III, R, R', R", M, X, $[MX_4]^-$, n and x are as defined above in Reactions I and II.

While not wishing to be limited by theory, the inventors believe that, in regard to Reaction III above, the N,N-dialkylaniline reacts with triphenylcarbenium cations forming quaternary ammonium ($\equiv$N–H$^+$) salts. $^1$H NMR inspection of the organic product, $(C_6H_5)_3C$—$C_6H_4$—N(n-Bu) implicates the phenyl ring on N,N-dialkylaniline as the H$^+$ source. The resulting cation activates metallocenes by protonation, as shown below in Reaction IV. For example, the reaction of $[(n-Bu)_2(C_6H_5)_3CC_6H_4)NH][B(C_6F_5)_4]$ (1,3-Me,BuCp)$_2$Zr($^{13}$CH$_3$)$_2$ results in the vigorous evolution of gas identified as methane ($^{13}$CH$_4$) and an activated metallocene catalyst. The amine $(C_6H_5)_3C$—$C_6H_4$—N(n-Bu)$_2$ is isolated by extracting the soluble organics with pentane from the activated catalyst.

Reaction (IV)

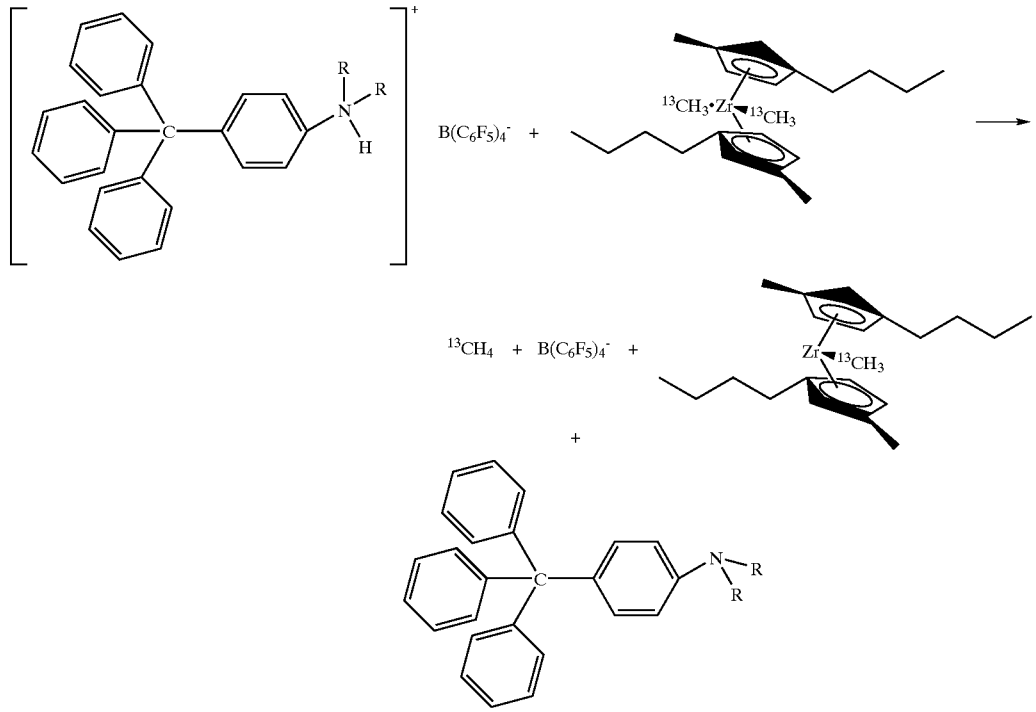

While not wishing to be limited by theory, the inventors believe that $[(n-Bu)_2(C_6H_5)_3CC_6H_4)NH][B(C_6F_5)_4]$ is a more suitable activator in catalyst activations where activity suffers due to the formation of dialkylaniline and coordination of the amine to the activated catalyst. The reaction of [(n-Bu)$_2$(C$_6$H$_5$)$_3$CC$_6$H$_4$)NH][B(C$_6$F$_5$)$_4$] with N,N-dibutylaniline yields [(C$_6$H$_5$)(Bu)$_2$NH][B(C$_6$F$_5$)$_4$], illustrated below as Reaction V, shows [(n-Bu)$_2$(C$_6$H$_5$)$_3$CC$_6$H$_4$)NH][B(C$_6$F$_5$)$_4$] is a stronger acid than [(C$_6$H$_5$)(Bu)$_2$NH][B(C$_6$F$_5$)$_4$] and thus the amine (C$_6$H$_5$)$_3$C—C$_6$H$_4$—N(n-Bu)$_2$ is a weaker base than N,N-dibutylaniline.

Reaction (V)

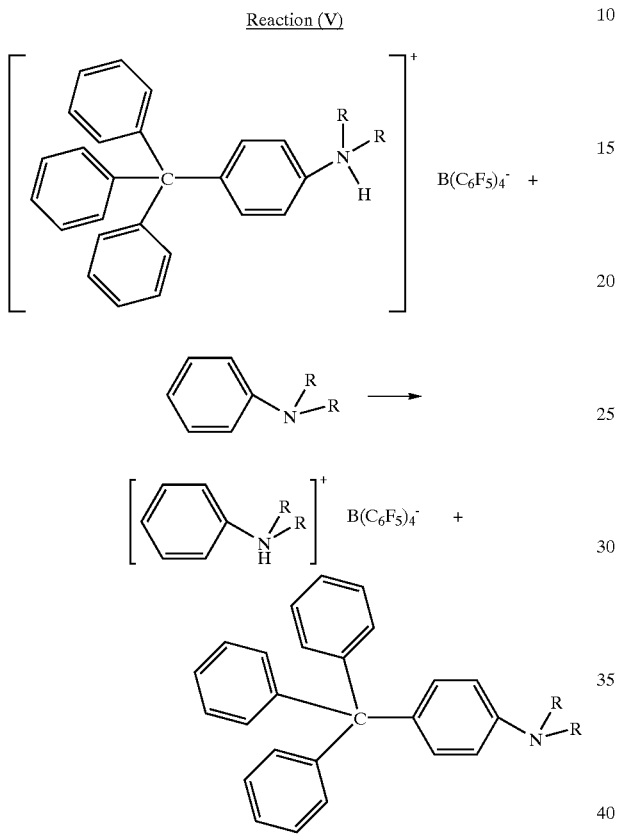

The activator complexes of the invention described above are readily synthesized by the reaction of the carbenium salt and the Lewis base, preferably the nitrogen containing Lewis base, having an aromatic group utilizing standard techniques.

In one embodiment, the activator complexes of the invention are zwitterionic complexes $X_3M^-$—[LQ—H$^+$], $X_3M^-$((C$_6$H$_y$R'''$_z$)$_3$CC$_6$H$_{n-1}$R'$_x$)Z(H$^+$)R, or $X_3M^{-(({}^C_6H_y.R''_z)}$$_3$CC$_6$H$_{n-1}$R'$_{x)N(H}$$^+$)R$_2$. In another embodiment these zwitterionic complexes are obtained via Reactions VI to VIII shown below between a Group 13 element containing salt including a Lewis base containing an aromatic group, preferably a borate and aluminate salt including a Lewis base containing aromatic group, and a substituted or unsubstituted tritylhalide compound.

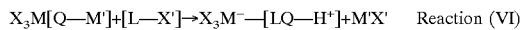  Reaction (VI)

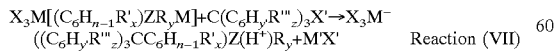  Reaction (VII)

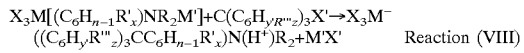  Reaction (VIII)

In Reactions (VI) to (VIII), X, M, Q, R, R' n, y and x are as defined above for Reactions I, II and/or III.

L is a positively charged derivative of a Group 14 element of the Periodic Table substituted with three hydrocarbyl substituents having from 1 to 50 carbon atoms. The hydrocarbyl substituents may be substituted or unsubstituted. Preferably, L is (trityl+) source represented by C$^+$(C$_6$H$_y$.R'''$_z$)3, as shown in Reaction (VII) where each R''' is a substituent group on the trityl halide compound. Each R''' is independently hydrogen, a halogen, a hydrocarbyl group, a substituted hydrocarbyl group, a heteroatom, or a heteroatom containing group.

M' is a suitable cation, preferably a metal cation, non-limiting examples of which include Li$^+$, K$^+$ and Na$^+$.

X' is a halogen; and y' and z are 0 or are integers from 1 to 4, where y'+z=4.

X$_3$M is a tri-substituted Group 13 element where the three substituent groups are each independently selected from alkyls, alkenyls, halogen, substituted alkyls, aryls arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). In another embodiment, the three groups are alkyls having 1 to 4 carbon groups, phenyl, napthyl or mixtures thereof. In another embodiment each of the three substituent groups is a fluorinated hydrocarbyl group having 1 to 20 carbon atoms, preferably a fluorinated aryl group, and more preferably a pentafluoryl aryl group. In another embodiment X$_3$M is trisperfluorophenyl boron, trisperfluorobiphenyl boron, or trisperfluoronapthyl boron.

Representatives of compounds having the general formula X$_3$M$^-$((C$_6$H$_y$R'''$_z$)$_3$CC$_6$H$_{n-1}$R'$_x$)N(H$^+$)R$_2$ from Reaction VI are represented by Compounds I, II and III below:

Compound (I)

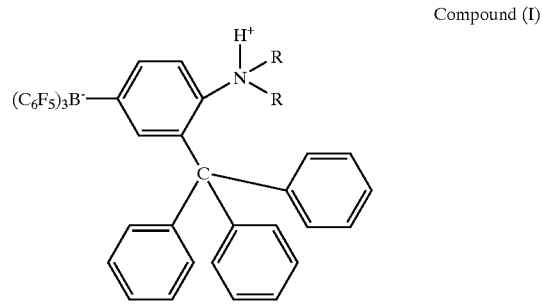

Compound (II)

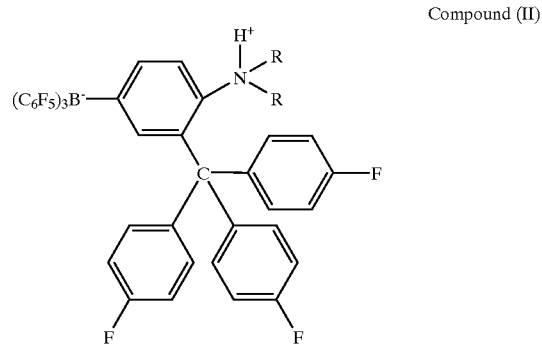

Compound (III)

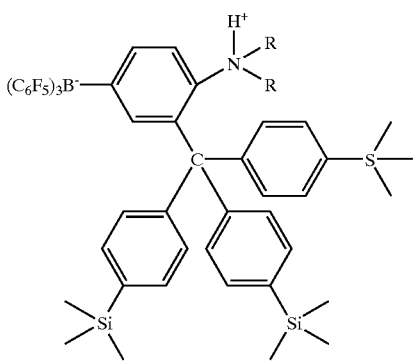

While not wishing to be limited by theory, the inventors believe, that by varying the substituents on the (trityl+) source a synthetic route to adjust the basicity of the heteroatom donor and the sterics of the anion may be achieved for an anion which contain heteroatoms on an aromatic moiety of the activator.

The zwitterion, H⁺N(CH$_2$CH$_3$)$_2$—C$_6$H$_3$(C(C$_6$H$_5$)$_3$)—B⁻(C$_6$F$_5$)$_3$, was also obtained through an analogous reaction to that described above, and found to activate metallocenes via the loss of methane. However, in this molecule, the nitrogen is a component of the anion and may serve to influence the strength of the ion pair formed upon catalyst activation.

The zwitterionic complexes of the invention described above are readily synthesized by the reaction of the Group 13 element containing salt including a Lewis base, preferably a nitrogen containing Lewis base, having an aromatic group, and the tritylhalide compound utilizing standard techniques.

In one embodiment, polymers having enhanced molecular weight are obtained utilizing the zwitterionic activators described above. For Example, H⁺N(CH$_2$CH$_3$)$_2$—C$_6$H$_3$(C(C$_6$H$_5$)$_3$)—B⁻(C$_6$F$_5$)$_3$, upon reaction with (1,3-Me,BuCp)$_2$Zr(CH$_3$)$_2$, as illustrated below by Reaction VIII, yielded higher molecular weight polymer than that obtained upon activating (1,3-Me,BuCp)$_2$Zr(CH$_3$)$_2$ with [(C$_6$H$_5$)$_3$C][(C$_6$F$_5$)$_4$B].

Reaction (VIII)

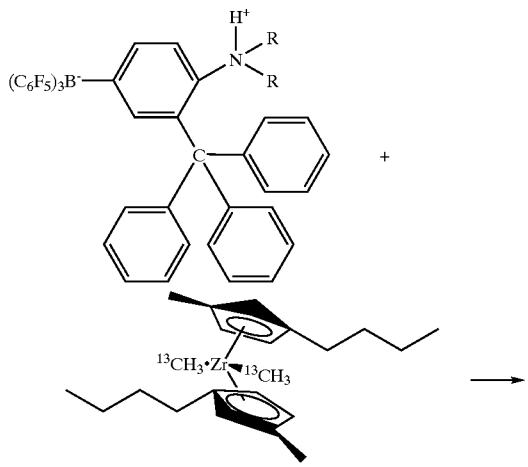

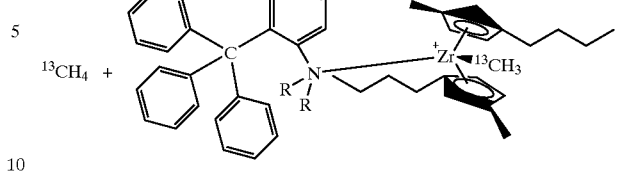

In another embodiment, one or more of the activators of the invention may be used in combination with each other or in combination with other activators or methods of activation. For example, the activators of the invention may be used in combination with other activators including alumoxane, modified alumoxane, tri(n-butyl)ammonium tetrakis(pentafluorophenyl)boron, a trisperfluorophenyl boron metalloid precursor or a trisperfluoronapthyl boron metalloid precursor, polyhalogenated heteroborane anions, trimethylaluminum, triethylaluminum, triisobutylaluminum, tri-n-hexylaluminum, tri-n-octylaluminum, tris (2,2',2"-nona-fluorobiphenyl)fluoroaluminate, perchlorates, periodates, iodates and hydrates, (2,2-bisphenyl-ditrimethylsilicate)•4THF and organo-boron-aluminum compound, silylium salts and dioctadecylmethylammonium-bis(tris(pentafluorophenyl)borane)-benzimidazolide or combinations thereof.

Catalyst Compositions

The activator complexes of the invention may be utilized in conjunction with any suitable polymerization catalyst compound or compounds to polymerize olefin(s). Examples of suitable catalyst compounds include bulky ligand metallocene catalyst compositions, Group 15 containing metal polymerization catalyst compositions, and phenoxide transition metal catalyst compositions. The following is a non-limiting discussion of the various polymerization catalysts which may be utilized with the activator complex of this invention.

Bulky Ligand Metallocene Catalyst Compositions

The activator complexes of the present invention may be used to activate bulky ligand metallocene catalyst compositions. Generally, these catalyst compounds include half and full sandwich compounds having one or more bulky ligands bonded to at least one metal atom. Typical bulky ligand metallocene compounds are described as containing one or more bulky ligand(s) and one or more leaving group(s) bonded to at least one metal atom.

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of the Elements. Preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of the Elements. Preferably the metal is a transition metal from Groups 4 through 12, more preferably Groups 4, 5 and 6, and most preferably the transition metal is from Group 4.

In one embodiment, the bulky ligand metallocene catalyst compounds, which may be utilized with the activator complex of the invention, may be represented by Formula (I):

$$L^A L^B MQ_n \qquad \text{Formula (I)}$$

where M is a metal atom from the Periodic Table of the Elements and may be a Group 3 to metal or from the lanthanide or actinide series of the Periodic Table of the Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not imited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the activator complex of the invention is utilized with the bulky ligand metallocene catalyst compounds of Formula (II) where $L^A$ and $L^B$ are bridged to each other by at least one bridging group, A, as represented in the following formula:

$$L^A A L^B MQ_n \qquad \text{Formula (II)}$$

These bridged compounds represented by Formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$, $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula (II) have two or more bridging groups A (EP 664 301 B1).

In another embodiment, the activator complex of the invention may be utilized with bulky ligand metallocene catalyst compounds where the R substituents on the bulky ligands $L^A$ and $L^B$ of Formulas (I) and (II) are substituted with the same or different number of substituents on each of the bulky ligands. In another embodiment, the bulky ligands $L^A$ and $L^B$ of formulas (I) and (II) are different from each other.

In another embodiment, the activator complex of the invention may be utilized with other bulky ligand metallocene catalyst compounds such as those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547, 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-BI-0 632 819, EP-B1-0 748 821 and EP-B1-0 757 996, all of which are fully incorporated herein by reference.

In another embodiment, the activator complex of the invention may be utilized with bulky ligand metallocene catalysts which include bridged heteroatom, mono-bulky ligand metallocene compounds. These types of catalysts and catalyst systems are described in, for example, PCT publication WO 92/00333, WO 94/07928, WO 91/04257, WO 94/03506, W096/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the activator complexes of the invention are utilized with a bulky ligand metallocene catalyst compound represented by Formula (III):

$$L^C AJMQ_n \qquad \text{Formula (III)}$$

where M is a Group 3 to 16 metal atom or a metal selected from the Group of actinides and lanthanides of the Periodic Table of the Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0,1 or 2. In Formula (III) above, $L^C$, A and J form a fused ring system. In an embodiment, $L^C$ of formula (III) is as defined above for $L^A$, A, M and Q of formula (III) are as defined above in formula (II).

In Formula (III) J is a heteroatom containing ligand in which J is an element with a coordination number of three from Group 15 or an element with a coordination number of two from Group 16 of the Periodic Table of the Elements. Preferably J contains a nitrogen, phosphorus, oxygen or sulfur atom with nitrogen being most preferred.

In another embodiment, the activator complex of the invention is utilized with a bulky ligand metallocene catalyst compound which is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment the activator complex of the invention is utilized with a ligand metallocene catalyst compound which may be represented by Formula IV:

$$L^D MQ_2(YZ)X_n \qquad \text{Formula IV}$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a unicharged polydentate ligand; A or Q is a univalent anionic ligand also bonded to M; X is a univalent anionic group when n is 2 or X is a divalent anionic group when n is 1; n is 1 or 2.

In Formula (IV), L and M are as defined above for Formula (I). Q is as defined above for formula (I), preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the activator complex of the invention is utilized with a bulky ligand metallocene catalyst compounds, which include heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. No. 5,637,660, 5,539,124, 5,554,775, 5,756,611, 5,233,049, 5,744,417, and 5,856,258 all of which are herein incorporated by reference.

In another embodiment, the activator complex of the invention may be utilized with bulky ligand metallocene catalyst compounds, which include complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the activator complex of the invention may be utilized with a bulky ligand metallocene catalyst compounds which may be represented by Formula V:

$$((Z)XA_t(YJ))_q MQ_n \qquad \text{Formula V}$$

where M is a metal selected from Group 3 to 13 or lanthanide and actinide series of the Periodic Table of the Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the bulky ligand metallocene catalyst compounds, which may be utilized with the activator complex of the invention include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene catalyst are those diimine based ligands of Group 8 to 10 metal compounds disclosed in PCT publications WO 96/23010 and WO 97/48735 and Gibson, et al., Chem. Comm., pp. 849–850 (1998), all of which are herein incorporated by reference.

Other bulky ligand metallocene catalysts, which may be utilized with the activator complex of the invention, are those Group 5 and 6 metal imido complexes described in EP-A2-0 816 384 and U.S. Pat. No. 5,851,945, which is incorporated herein by reference. In addition, bridged bis (amido) catalyst compounds are described in WO 96/27439, which is herein incorporated by reference. Other bulky ligand metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference. Still another metallocene bulky ligand metallocene catalysts include those multinuclear bulky ligand metallocene catalysts as described in WO 99/20665, which is incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Group 15 Containing Polymerization Catalyst

The activator complexes of the invention may also be utilized with metal containing Group 15 polymerization catalyst compounds. Generally, these catalysts includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

Preferably, at least one of the Group 15 atoms is also bound to a Group 15 or 16 atom through another group which may be a $C_1$ to C hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In another embodiment of the invention the composition containing alternating atoms of Group 14 and Group 16 may be used to create solutions or emulsions including one or more bulky ligand metallocene catalyst compounds, and one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Metal containing Group 15 catalyst compounds may be represented by Formulae (VI) or (VII):

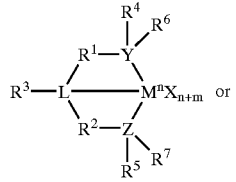

Formula (VI)

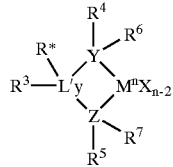

Formula (VII)

wherein M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a heteroatom or a halogen, and most preferably an alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group.

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R_1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, a heteroatom containing group.

By "formal charge of the YZL or YZL' ligand", it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

Phenoxide Transition Metal Catalyst Compositions

The activator complexes of the invention may also be used with phenoxide transition metal catalyst compounds. Generally, these complexes are heteroatom substituted phenoxide ligated Group 3 to 10 transition metal or lanthanide metal compounds wherein the metal is bound to the oxygen of the phenoxide group.

Phenoxide transition metal catalyst compounds may be represented by Formulae VIII or IX:

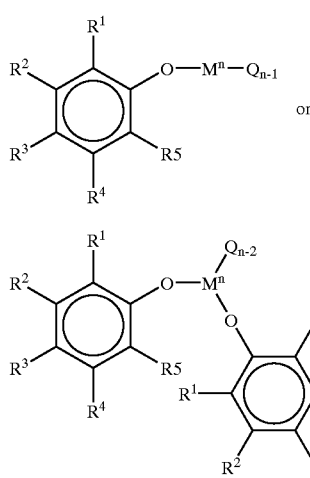

Formula (VIII)

or

Formula (XIII)

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M;

at least one of $R^2$ to $R^5$ is a heteroatom containing group, the rest of $R^2$ to $R^5$ are independently hydrogen or a $C_1$ to $C_{100}$ group, preferably a $C_4$ to $C_{20}$ alkyl group, preferred examples of which include butyl, isobutyl, t-butyl, pentyl, hexyl, heptyl, isohexyl, octyl, isooctyl, decyl, nonyl, dodecyl, and any of $R^2$ to $R^5$ also may or may not be bound to M;

Each $R^1$ to $R^5$ group may be independently substituted or unsubstituted with other atoms, including heteroatoms or heteroatom containing group(s);

O is oxygen;

M is a Group 3 to Group 10 transition metal or lanthanide metal, preferably a Group 4 metal, preferably M is Ti, Zr or Hf;

n is the valence state of the metal M, preferably 2, 3, 4, or 5; and

Q is, and each Q may be independently be, an alkyl, halogen, benzyl, amide, carboxylate, carbamate, thiolate, hydride or alkoxide group, or a bond to an R group containing a heteroatom which may be any of $R^1$ to $R^5$.

A heteroatom containing group may be any heteroatom or a heteroatom bound to carbon, silicon or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include nitrogen and oxygen. The heteroatom itself may be directly bound to the phenoxide ring or it may be bound to another atom or atoms that are bound to the phenoxide ring. The heteroatom containing group may contain one or more of the same or different heteroatoms. Preferred heteroatom containing groups include imines, amines, oxides, phosphines, ethers, ketones, oxoazolines heterocyclics, oxazolines, thioethers, and the like. Particularly preferred heteroatom containing groups include imines. Any two adjacent R groups may form a ring structure, preferably a 5 or 6 membered ring. Likewise the R groups may form multi-ring structures. In one embodiment any two or more R groups do not form a 5 membered ring.

In a preferred embodiment the heteroatom substituted phenoxide transition metal compound is an iminophenoxide Group 4 transition metal compound, and more preferably an iminophenoxidezirconium compound.

Other Bulky Ligand Metallocene Catalyst Compounds

Other catalysts are those Group 5 and 6 metal imido complexes described in EP-A2-0 816 384 and U.S. Pat. No. 5,851,945, which is incorporated herein by reference. In addition, other catalysts include bridged bis(arylamido) Group 4 compounds described by D. H. McConville, et al., in Organometallics 1195, 14, 5478–5480, which is herein incorporated by reference. Bridged bis(amido) catalyst compounds are described in WO 96/27439, which is herein incorporated by reference may also be activated by the compositions of the present invention. Other suitable catalysts are described as bis(hydroxy aromatic nitrogen ligands) in U.S. Pat. No. 5,852,146, which is incorporated herein by reference. Other catalysts containing one or more Group 15 atoms include those described in WO 98/46651, which is herein incorporated herein by reference. Still another catalysts include those multinuclear bulky ligand metallocene catalysts as described in WO 99/20665, which is incorporated herein by reference.

It is also contemplated that in one embodiment, the activator complexes of the inventions are utilized with bulky ligand metallocene catalysts including their structural or optical or enantiomeric isomers (meso and racemic isomers, for example see U.S. Pat. No. 5,852,143, incorporated herein by reference) and mixtures thereof.

In another embodiment, it is further contemplated that the polymerization catalysts, described above may be used in combination with the activator(s) of the present invention.

In one embodiment, the mole ratio of the metal of the activator component of the invention to the metal component is preferably in the range of ratios of between 0.3:1 to 3:1.

Supports, Carriers and General Supporting Techniques

The activator complexes of the invention and/or the polymerization catalyst compound may be combined with one or more support materials or carriers, using one of the support methods known in the art or as described below. For example, in one embodiment the activator complex is in a supported form, for example deposited on, contacted with, vaporized with, bonded to, or incorporated within, adsorbed or absorbed in, or on, a support or carrier. In another embodiment, the activator and a catalyst compound may be deposited on, contacted with, vaporized with, bonded to, or incorporated within, adsorbed or absorbed in, or on, a support or carrier.

The terms "support" or "carrier", for purposes of this patent specification, are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene, divinyl benzene, polyolefins, or polymeric compounds, zeolites, talc, clays, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665), phyllosilicate, and the like. Also, combinations of these support materials may be used, for example, silica-chromium, silica-alumina, silica-titania and the like. Additional support materials may include those porous acrylic polymers described in EP 0 767 184 B1, which is incorporated herein by reference.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu$m. More preferably, the surface area of the carrier is in the range of from about 50 to about 500 $m^2/g$, pore volume of from about 0.5 to about 3.5 cc/g and average particle size of from about 10 to about 200 $\mu$m. Most preferably the surface area of the carrier is in the range is from about 100 to about 400 $m^2/g$, pore volume from about 0.8 to about 3.0 cc/g and average particle size is from about 5 to about 100 $\mu$m. The average pore size of the carrier of the invention typically has pore size in the range of from 10 to 1000 Å, preferably 50 to about 500 Å, and most preferably 75 to about 350 Å.

Examples of supporting bulky ligand metallocene-type catalyst systems, which may be used to support the activator and/or catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. Nos. 271,598 filed Jul. 7, 1994 and 788,736 filed Jan. 23, 1997 and PCT publications WO 95/32995, WO 95/14044, WO 96/06187 and WO 97/02297, and EP-B1-0 685 494 all of which are herein fully incorporated by reference.

In another embodiment, an antistatic agent or surface modifier, that is used in the preparation of the supported catalyst system as described in PCT publication WO 96/11960, which is herein fully incorporated by reference, may be used with catalyst systems including the activator compounds of the invention. The catalyst systems of the invention may also be prepared in the presence of an olefin, for example hexene-1.

In another embodiment, activator and/or catalyst system of the invention may be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998.

In another embodiment there is a method for producing a supported bulky ligand metallocene catalyst system, which maybe used to support the activator of the invention which is described below, and is described in U.S. application Ser. Nos. 265,533, filed Jun. 24, 1994 and Ser. No. 265,532, filed Jun. 24, 1994 and PCT publications WO 96/00245 and WO 96/00243 both published Jan. 4, 1996, all of which are herein fully incorporated by reference. In this method, the catalyst compound is slurried in a liquid to form a catalyst solution or emulsion. A separate solution is formed containing the activator. The liquid may be any compatible solvent or other liquid capable of forming a solution or the like with the catalyst compounds and/or activator. In the most preferred embodiment the liquid is a cyclic aliphatic or aromatic hydrocarbon, most preferably toluene. The catalyst compound and activator solutions are mixed together heated and added to a heated porous support or a heated porous support is added to the solutions such that the total volume of the bulky ligand metallocene-type catalyst compound solution and the activator solution or the bulky ligand metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

In one embodiment, a method of forming a supported catalyst system, the amount of liquid, in which the activator of the invention and/or a catalyst compound is present, is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of*

*Fluid Catalysts By Liquid Titration*, Vol. 28, No. 3, Analytical Chemistry 332–334 (March, 1956).

Polymerization Process

The activators of the invention, catalyst systems and supported catalyst systems utilizing the activators described above are suitable for use in any prepolymerization and/or polymerization process over a wide range of temperatures and pressures. The temperatures may be in the range of from −60° C. to about 280° C., preferably from 50° C. to about 200° C. In another embodiment the polymerization temperature is above 0° C., above 50° C., above 80° C., above 100° C., above 150° C., or above 200° C. In one embodiment the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefin(s) at least one of which is ethylene or propylene.

In one embodiment, the process of the invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In another embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace, the polymerized monomer. (See for example U.S. Pat. Nos. 4,543, 399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C. In another embodiment, the reactor temperature in a gas phase process is above 60° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B1-0 649 992, EP-A-0 802 202 and EP-B-634 421 all of which are herein fully incorporated by reference.

In another embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In another embodiment, the slurry process temperature is above 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In another embodiment, the polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference.

In one embodiment of the process of the invention is the process, preferably a slurry or gas phase process is operated in the presence of the catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352 and 5,763,543, which are herein fully incorporated by reference.

In another embodiment, the method of the invention provides for injecting a the catalyst system of the invention into a reactor, particularly a gas phase reactor. In one embodiment the catalyst system is used in the unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with an activator, and/or a support, and/or a supported activator together or separately to a reactor. The injection methods described in PCT publication WO 97/46599, which is fully incorporated herein by reference, may be utilized. Where an unsupported catalyst system is used the mole ratio of the metal of the Lewis acid activator component to the metal of the phenoxide transition metal catalyst compound is in the range of between 0.3:1 to 10,000:1, preferably 100:1 to 5000:1, and most preferably 500:1 to 2000:1.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from no measurable flow to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by AStM-D-1238-F) of from 10 to less than 25, more preferably from about 15 to less than 25.

The polymers of the invention in a preferred embodiment have a melt index ratio ($I_2$)/$I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection: molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Polymerizations were conducted in a stainless steel, 1-liter Zipperclave autoclave reactor. The reactor was equipped with water jacket for heating and cooling. Injections were typically done through a septum inlet or were injected via a high pressure nitrogen injection. Before polymerizations the reactor was purged with nitrogen for several hours at 100° C. Upon injection of catalyst ethylene was fed continuously on demand keeping the reactor pressure constant while maintaining the reaction temperature at 60° C. The reaction was stopped by cooling, venting the pressure, and exposing the contents of the reactor to air. The liquid components were evaporated and the poly(ethylene-co-hexene-1) was dried in a vacuum oven. Weight average molecular weight (Mw), number average molecular weight (Mn) and their ratio Mw/Mn were obtained by GPC gel permeation chromotagraphy. Hexene wt % incorporation was obtained from $^1$H NMR data.

Tris-pentafluorophenylborane was purchased from Boulder Scientific Co., Mead, Colo., U.S.A and used as received. Anhydrous toluene, dichloromethane and pentane was purchased from Aldrich, Milwaukee, Wis., U.S.A. N,N-dimethylaniline and N,N-dibutylaniline were purchase from Aldrich and dried with alumina beads calcined at 600° C. 2.5 M n-butyl lithium in hexanes was purchased from Aldrich and used as received. 4-bromo diethylaniline was purchased from Lancaster Synthesis, Inc, Windham, N.H., U.S.A. and used as received.

Example 1

Synthesis of $(CH_3CH_2)_2(C_6H_5)_3C(C_6H_3)NHB(C_6F_5)_3$

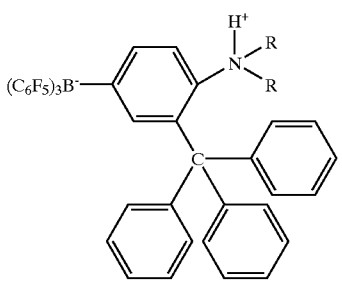

17.5 mls of a 2.5 M butyl lithium solution was added dropwise to a pentane solution of 4-bromodiethyl aniline (10.0 grams). The solution was stirred overnight. A white precipitate was isolated (4.5 grams) $(LiC_6H_4N(Et_2))$. $^1$H NMR (THF-d8) δ 1.06 t (6H), 3.19 q (4H), 6.48 d (2H), 7.70 d (2H).

7.0 grams of $LiC_6H_4N(Et_2)$ was combined with $B(C_6F_5)_3$ (23.0 grams) in pentane at −70° C. The resulting slurry was allowed to warm to room temperature and stirred overnight. The slurry was filtered yielding an off white powder $Li(CH_3CH_2)_2N(C_6H_4)B(C_6F_5)_3$ (22.9 grams). $^1$H NMR (THF-d8) δ 1.01 t (6H), 3.15 q (4H), 6.29 d (2H), 6.95 d (2H). $^{19}$F NMR (THF-d8) δ −130.1 (d), −167.4 (t), −169.3 (m). $Li(CH_3CH_2)_2N(C_6H_4)B(C_6F_5)_3$ (22.9 grams). was slurried in 300 mls of $CH_2Cl_2$ at −70° C. 9.56 grams of $(C_6H_5)_3CCl$ was added to the reaction mixture. An olive green solution formed and was allowed to warm to room temperature. The slurry was filtered to remove lithium chloride. The solution was concentrated and the product was precipitated with pentane. $^{19}$F NMR $(CD_2Cl_2)$ δ −130.9, −163.7, −167.

Example 2

Synthesis of $[(C_6H_5)_3CC_6H_4)(CH_3)_2NH][B(C_6F_5)_4]$ $[(C_6H_5)_3C][B(C_6F_5)_4]$ was dissolved in dichloromethane and added dropwise to a solution of N,N-dimethylaniline. The resulting solution was green. The product was precipitated with pentane. $^1$H NMR $(CD_2Cl_2)$ δ 3.4 s, 4.0, 4.15, 7.15 m, 7.50 m. $^{19}$F NMR $(CD_2Cl_2)$ δ −133.6 (d), −163.3 (t), −167.6 (m). Note: Trace amounts of $(C_6H_5)_3C$—H were isolated from pentane extracts.

Example 3.1

Synthesis of $[(C_6H_5)_3CC_6H_4)(Bu)_2NH][B(C_6F_5)_4]$ $[(C_6H_5)_3C][B(C_6F_5)_4]$ (2.0 grams) was dissolved in dichloromethane added dropwise to a solution of N,N-dibutylaniline (0.444 grams). The resulting solution was light green. The solvent was concentrated and the product was precipitated with pentane and dried under vacuum. $^1$H NMR $(C_6D_6)$ δ 0.7 m, 0.84 m, 2.46 m, 3.1 m, 6.26 m, 7.08 m, 7.38 d. $^{19}$F NMR $(CD_2Cl_2)$ δ −133.6 (d), −163.3 (t), −167.6 (m). Note: Trace amounts of $(C_6H_5)_3C$—H were isolated from pentane extracts.

Example 3.2

Reaction of $[(C_6H_5)_3C][B(C_6F_5)_4]$ with excess N,N-dibutylaniline $[(C_6H_5)_3C][B(C_6F_5)_4]$ (2.0 grams) was slurried in toluene. N,N-dibutylaniline (0.522 grams) was added dropwise to the slurry. The resulting solution was light green. The solvent was concentrated. Colorless crystals formed $[(C_6H_5)(Bu)_2NH][B(C_6F_5)_4]$. $^1$H NMR $(C_6D_6)$ δ 0.78 t (6H), 1.3 m (4H), 1.44 m (4H), 3.51 t (4H), 6.13 br (1H), 7.16 m (3H), 7.56 m (2H), $^{19}$F NMR $(C_6D_6)$ δ −133.5−163.8 (t), −167.3. The pentane extracts yielded $(C_6H_5)_3C$—$C_6H_4$—$N(n-Bu)_2$ $^1$H NMR $(C_6D_6)$ δ 0.79 t , 1.14 m, 1.37 m, 3.01 t, 6.50 d, 7.06 m, 7.2 d, 7.49 d. Note: Trace amounts of $(C_6H_5)_3C$—H were also observed from the pentane extracts.

Example 4

Reaction of $[(C_6H_5)_3CC_6H_4)(BU)_2NH][B(C_6F_5)_4]$ and $(1,3-Me,BuCp)_2Zr(^{13}CH_3)_2$ $(1,3-Me,BuCp)_2Zr(^{13}CH_3)_2$ (70 mg) was combined with $[(C_6H_5)_3CN(C_6H_5)(CH_3)_2][B(C_6F_5)_4]$ in deuterated benzene. Evolution of a gas was observed $^1$H NMR $(C_6D_6)$ $^{13}CH_4$, δ 0.15 doublet ($^1$J13C—H=125 Hz). The activated catalyst precipitates from solution as an oil. The benzene filtrates contained the compound assigned as $(C_6H_5)_3C$—$C_6H_4$—$N(n-Bu)_2$. $^1$H NMR $(C_6D_6)$ δ 0.78 t , 1.16 m, 1.38 m, 3.01 t, 6.52 d, 7.07 m, 7.31 d, 7.47 d. The experiment was repeated with the unlabeled $(1,3-Me,BuCp)_2Zr(CH_3)_2$. The results were identical with formation of $CH_4$. $^1$H NMR $(C_6D_6)$ δ 0.15 singlet.

Example 5

Reaction of $(CH_3CH_2)_2(C_6H_5)_3C(C_6H_3)NHB(C_6F_5)_3$ and $(1,3-Me,BuCp)_2Zr(^{13}CH_3)_2$ $(1,3-Me,BuCp)_2Zr(^{13}CH_3)_2$ (44 mg) was combined with $[(C_6H_5)_3CN(C_6H_5)(CH_3)_2][B(C_6F_5)_4]$ (0.1 g) in deuterated benzene. Evolution of a gas was observed $^1$H NMR ($C_6D_6$): $^{13}CH_4$, δ 0.15 doublet ($^1$J13C—H=125 Hz). The activated catalyst was soluble in benzene. The solvent was removed and the residue was washed with pentane. The pentane extracts yielded only trace ($C_6H_5$)$_3$C—H.

Example 6

Polymerization Utilizing rac-Me$_2$Si(2-Me-indenyl)$_2$Zr(CH$_3$)$_2$) (CH$_3$CH$_2$)$_2$(C$_6$H$_5$)$_3$C(C$_6$H$_3$)NHB(C$_6$F$_5$)$_3$ rac-Me$_2$Si(2-Me-indenyl)$_2$Zr(CH$_3$)$_2$) (20 mg) and (CH$_3$CH$_2$)$_2$(C$_6$H$_5$)$_3$C(C$_6$H$_3$)NHB(C$_6$F$_5$)$_3$ (41 mg) were combined in 10 mls of toluene. The resulting solution is yellow. 2×3 mls of the catalyst precursor solution was injected into a 1 L stainless steel reactor preheated to 60° C. containing 45 mls of hexene, 75 psi of ethylene, and 500 mls of toluene. After 40 minutes the polymerization reaction was stopped and 27.76 grams of polymer was isolated. Mw=105000, Mn=57000, Mw/Mn=1.84; Hexene wt %=10.1.

Example 7

Polymerization Utilizing rac-Me$_2$Si(2-Me-indenyl)$_2$Zr(CH$_3$)$_2$) and (CH$_3$CH$_2$)$_2$(C$_6$H$_5$)$_3$C(C$_6$H$_3$)NHB(C$_6$F$_5$)$_3$ rac-Me$_2$Si(2-Me-indenyl)$_2$Zr(CH$_3$)$_2$) (20 mg) and (CH$_3$CH$_2$)$_2$(C$_6$H$_5$)$_3$C(C$_6$H$_3$)NHB(C$_6$F$_5$)$_3$ (41 mg) were combined in 10 mls of toluene. The resulting solution is yellow. 2 mls of the catalyst precursor solution was injected into a 1 L stainless steel reactor preheated to 60° C. containing 45 mls of hexene, 75 psi of ethylene, 150 μls of 25 wt % triisobutylaluminum, and 500 mls of toluene. After 40 minutes the polymerization reaction was stopped and 65.36 grams of polymer was isolated. Mw=113000, Mn=54000, Mw/Mn=2.10; Hexene wt %=35.2.

Example 8

Polymerization Utilizing (1,3-Me,BuCP)$_2$Zr(CH$_3$)$_2$ and (CH$_3$CH$_2$)$_2$(C$_6$H$_5$)$_3$C(C$_6$H$_3$)NHB(C$_6$F$_5$)$_3$ (1,3-Me,BuCp)$_2$Zr(CH$_3$)$_2$ (20 mg) and (CH$_3$CH$_2$)$_2$(C$_6$H$_5$)$_3$C(C$_6$H$_3$)NHB(C$_6$F$_5$)$_3$ (36 mgs) were combined in 10 mls of toluene. The resulting solution is green. 2 mls of the catalyst precursor solution was injected into a 1 L stainless steel reactor preheated to 60° C. containing 75 psi of ethylene, 45 mls of hexene, 150 μls of 25 wt % triisobutylaluminum, and 500 mls of toluene. After 30 minutes the polymerization reaction was stopped and 110.2 grams of polymer was isolated. Mw=105000, Mn=34900, Mw/Mn=3.00; Hexene wt %=17.0.

Example 9

Polymerization Utilizing (1,3-Me,BuCp)$_2$Zr(CH$_3$)$_2$ and (CH$_3$CH$_2$)$_2$(C$_6$H$_5$)$_3$C(C$_6$H$_3$)NHB(C$_6$F$_5$)$_3$ (1,3-Me,BuCp)$_2$Zr(CH$_3$)$_2$ (20 mg) and (CH$_3$CH$_2$)$_2$(C$_6$H$_5$)$_3$C(C$_6$H$_3$)NHB(C$_6$F$_5$)$_3$ (66 mg) were combined in 10 mls of toluene. The resulting solution is green. 2×3 mls of the catalyst precursor solution was injected into a 1 L stainless steel reactor preheated to 60° C. containing 75 psi of ethylene, 45 mls of hexene and 500 mls of toluene. After 30 minutes the polymerization reaction was stopped and 25.66 grams of polymer was isolated. Mw=415000, Mn=195000, Mw/Mn=2.13; Hexene wt %=9.2.

Comparative Example 10

Polymerization Utilizing (1,3-Me,BUCP)$_2$Zr(CH$_3$)$_2$ and [(C$_6$H$_5$)$_3$C][(C$_6$F$_5$)$_4$B]

(1,3-Me,BuCp)$_2$Zr(CH$_3$)$_2$ (20 mg) and [(C$_6$H$_5$)$_3$C][(C$_6$F$_5$)$_4$B] (71 mg) were combined in 10 mls of toluene. The resulting solution is yellow. 2 mls of the catalyst precursor solution was injected into a 1 L stainless steel reactor preheated to 60° C. containing 75 psi of ethylene, 45 mls of hexene and 500 mls of toluene. After 30 minutes the polymerization reaction was stopped and 67.7 grams of polymer was isolated. Mw=120000, Mn=19400, Mw/Mn 6.17; Hexene wt %=16.2.

Comparative Example 11

Polymerization Utilizing nBuCp)$_2$Zr(CH$_3$)$_2$) and [(C$_6$H$_5$)$_3$C][B(C$_6$F$_5$)$_4$]

(nBuCp)$_2$Zr(CH$_3$)$_2$) (20 mg) and [(C$_6$H$_5$)$_3$C][B(C$_6$F$_5$)$_4$] (50 mg) were combined in 10 mls of toluene. The resulting solution is golden. 2 mls of the catalyst precursor solution was injected into a 1 L stainless steel reactor preheated to 60° C. containing 75 psi of ethylene, 45 mls of hexene, and 400 mls of toluene. After 1 hour the polymerization reaction was stopped and 10.68 grams of polymer was isolated.

Example 12

Polymerization Utilizing (nBuCP)$_2$Zr(CH$_3$)$_2$) and [(C$_6$H$_5$)$_3$CC$_6$H$_4$)(CH$_3$)$_2$NH][B(C$_6$F$_5$)$_4$ (nBuCp)$_2$Zr(CH$_3$)$_2$) (20 mg) and [(C$_6$H$_5$)$_3$CC$_6$H$_4$)(CH$_3$)$_2$NH][B(C$_6$F$_5$)$_4$ (56 mg) were combined in 10 mls of toluene (vigorous evolution of gas is observed). The resulting solution is golden. 2 mls of the catalyst precursor solution was injected into a 1 L stainless steel reactor preheated to 60° C. containing 75 psi of ethylene, 45 mls of hexene, and 400 mls of toluene. After 1 hour the polymerization reaction was stopped and 7.33 grams of polymer was isolated.

What is claimed is:

1. A catalyst system comprising a catalyst compound and an activator complex wherein the activator complex is represented by the formula:

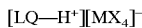

wherein L is an element selected from Group 14 of the Periodic Table of the Elements, substituted with three hydrocarbyl substituents;

Q is an aryl substituted neutral Lewis base;

M is an element selected from Group 13 of the Periodic Table of the Elements;

Each X is independently is independently an aromatic hydrocarbon radical or a substituted aromatic hydrocarbon radical.

2. The catalyst system of claim 1 wherein the activator complex is prepared according to the following reaction:

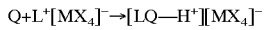

wherein L$^+$ is a positively charged derivative of an element selected from Group 14 of the Periodic Table of the Elements, substituted with three hydrocarbyl substituents.

3. The catalyst system of claim 1 wherein Q is an aryl substituted nitrogen, phosphorous, or sulfur containing Lewis base.

4. The catalyst system of claim 1 wherein M is boron or aluminum.

5. The catalyst system of claim 1 wherein each X is independently selected from the group consisting of a partially or fully fluorinated hydrocarbyl group having 1 to 20 carbon atoms, a partially or fully fluorinated aryl group, a partially of fully fluorinated napthyl group, and a partially or fully fluorinated biphenyl group.

6. The catalyst system of claim 2 wherein L⁺ is selected from the group consisting of a stable carbenium ion containing up to 30 non-hydrogen atoms, and a stable silylium ion containing up to 30 non-hydrogen atoms.

7. The catalyst system of claim 6 wherein L⁺ is triphenyl carbenium.

8. The catalyst system of claim 1 wherein [MX₄]⁻ is selected from the group consisting of tetra(phenyl)borate, tetra(tolyl)borate, tetra(pentafluorophenyl)borate, tetra(dimethylphenyl)borate, tetra(pentafluorophenyl)aluminate, and tetrafluoroaluminate.

9. A catalyst system for polymerizing olefin(s) comprising contacting one or more olefins(s) with a catalyst system comprising a catalyst compound and activator comlex wherein the activator complex is represented by the fomula:

[(R"₃CC₆H$_{n-1}$R'$_x$)ZR$_y$H⁺][MX₄]⁻ wherein Z is an element selected from Group 15 or 16 of the Periodic Table of Elements;
    each R is independenly selected from the group consisting of hydrogen, a hydrocarvyl group, an hadroxyl group, an aryl group, and an alkyl group;
    each R' is independently selected from the group consisting on hydrogen, a hydrocarvyl group, a hlohgen, a heteroatom, and a beteroatom, containing group
    each R" is independently selected from one of a hydrocarbyl group, or a substituted hydrocarbyl group;
    y is an integer from 1 to 5;
    x is an integer from 1 to 4;
    x+n=5;
    M is end element selected from Group 13 of the Periodic Table of the Elements; and each X is independently an aromatic hydrocarbon radical or a substituterd aromatic hydrocarbon radical.

10. The catalyst system of claim 9 wherein the activator complex is prepared according to the following reaction:

R$_y$Z(C₆H$_n$R'$_x$)+R"₃C⁺[MX₄]⁻→[(R"₃CC₆H$_{n-1}$R'$_x$)ZR$_y$H⁺][MX₄]⁻.

11. The catalyst system of claim 9 wherein Z is a Group 15 element or nitrogen, phosphorus, or sulfur.

12. The catalyst system of claim 9 wherein each R is an alkyl group having from 1 to 50 carbon atoms.

13. The catalyst system of claim 9 wherein each R" is a substituted or unsubstitited aryl substituted alkyl group.

14. The catalyst system of claim 9 wherein each R" is a phenyl group.

15. The catalyst system of claim 10 wherein R,Z(C₆H$_n$R'$_x$) is a N,N-dialkylanlline compound.

16. The catalyst system of claim 9 wherein [MX₄]⁻ is selected from the group consisting of tetra(phenyl)borate, tetra(tolyl)borate, tetra(pentafluorophenyl)borate, tetra(dimethylphenyl)borate, tetra(pentafluorophenyl)aluminate, and tetrafluoroaluminate.

17. The catalyst system of claim 9 wherein the activator complex is represented by the formula:

[(R"₃CC₆H$_{n-1}$R'$_x$)NR₂H⁺][MX₄]⁻.

18. A catalyst system for polymerizing olefin(s) comprising contacting one or more olefin(s) with a catalyst system comprising a catalyst compound and an activator complex wherein the activator complex is, represented by formula:

X₃M⁻—[LQ—H⁺]

wherein each X is independently an aromatic hydrocarbon radical or a substituted aromatic hydrocarbon radical;
    M is an element selected from Group 13 of the Periodic Table of the Elements;
    Q is an aryl substituted neutral Lewis base; and
    L is a positively charged derivative of a Group 14 element of the Periodic Table substituted with three substituted or unsubstituted hydrocarbyl substituents having from 1 to 50 carbon atoms.

19. The catalyst system of claim 18 wherein the activator complex is prepared according to the following reaction:

X₃M[Q—M']+[L—X']→X₃M⁻—[LQ—H⁺]+M'X' wherein M' is a metal cation; and
    X' is a halogen.

20. The catalyst system of claim 18 wherein M is boron or aluminum.

21. The catalyst system of claim 18 wherein each X is independently selected from the group consisting of a partially or fully fluorinated hydrocarbyl group having 1 to 20 carbon atoms, a partially or fully fluorinated aryl group, a partially of fully fluorinated napthyl group, and a partially or fully fluorinated biphenyl group.

22. The catalyst system of claim 18 wherein Q is an aryl substituted nitrogen, phosphorous, or sulfur containing Lewis base.

23. The catalyst system of claim 18 wherein L is represented by C⁺(C₆H$_y$R'''$_z$) and wherein:
    each R''' is independently selected from the group consisting of hydrogen, a halogen, a hydrocarbyl group, a substituted hydrocarbyl group, a heteroatom, and a heteroatom containing group;
    y' and z are 0 or are integers from 1 to 4; and y+z=4.

24. The catalyst system of claim 18 wherein the activator complex is represented by the formula:

X₃M⁻((C₆H$_y$R'''$_z$)₃CC₆H$_{n-1}$R'$_x$)Z(H⁺)R$_y$ wherein Z is an element selected from Group 15 or 16 of the Periodic Table of the Elements;
    each R is independently selected from the group consisting of hydrogen, a hydrocarbyl group, an hydroxyl group, an aryl group, and an alkyl group;
    each R' is independently selected from the group consisting of hydrogen, a hydrocarbyl group, a halogen, a heteroatom, and a heteroatom containing group;
    each R''' is independently selected from the group consisting of hydrogen, a halogen, a hydrocarbyl group, a substituted hydrocarbyl group, a heteroatom, and a heteroatom containing group;
    y' and z are 0 or are integers froth 1 to 4;
    y+z=4;
    y is an integer from 1 to 5;
    x is an integer from 1 to 4;
    x+n=5.

25. The catalyst system of claim 24 wherein the activator complex is prepared according to the following reaction:

X₃M[(C₆H$_{n-1}$R'$_x$)ZR$_y$M']+C(C₆H$_y$R'''$_z$)₃X'→X₃M⁻((C₆H$_y$R'''$_z$)₃CC₆H$_{n-1}$R'$_x$)Z(H⁺)R$_y$+M'X' wherein M' is a metal cation; and
    X' is a halogen.

26. The catalyst system of claim 18 wherein the activator complex is represented by the formula

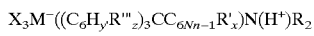

wherein each R is independently selected from the group consisting of hydrogen, a hydrocarbyl group, an hydroxyl group, an aryl group, and an alkyl group;

each R' is independently selected from the group consisting of hydrogen, a hydrocarbyl group, a halogen, a heteroatom, and a heteroatom containing group;

each R''' is independently selected from the group consisting of hydrogen, a halogen, a hydrocarbyl group, a substituted hydrocarbyl group, a heteroatom, and a heteroatom containing group;

y' and z are 0 or are integers from 1 to 4;

y'+z=4;

y is an integer from 1 to 5;

x is an integer from 1 to 4;

x+n=5.

27. The catalyst system of claim 1 wherein the activator complex is prepared according to the following reaction:

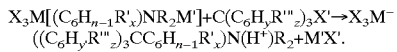

28. The catalyst system of claim 17 wherein $X_3M$ is a tri-substituted Group 13 element wherein the three substituent groups are each independently selected from the group consisting of a fluorinated hydrocarbyl group having 1 to 20 carbon atoms, a fluorinated aryl group, and a pentafluoryl aryl group.

29. The catalyst system of claim 17 wherein the activator complex is represented by (I), (II) or (III):

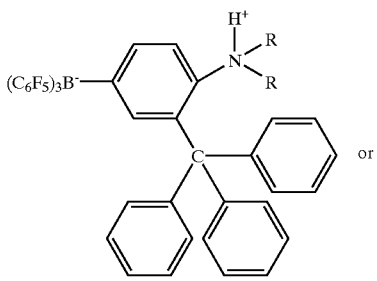

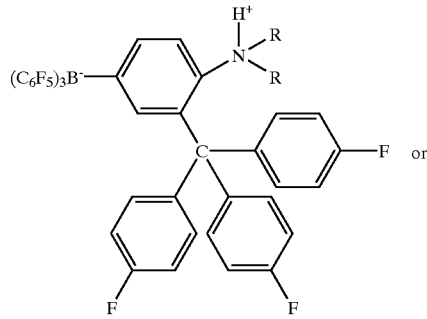

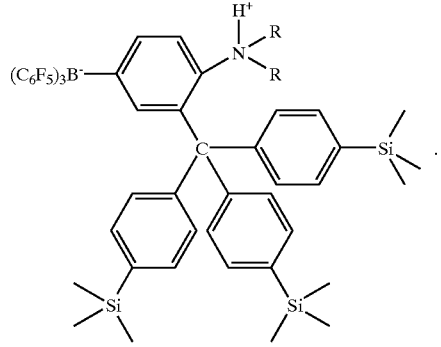

30. A process for polymerizing olefin(s) comprising contacting one or more olefin(s) with a catalyst system comprising a catalyst compound and the activator complex described by claim 1.

31. A process for polymerizing olefin(s) comprising contacting one or more olefin(s) with a catalyst system comprising a catalyst compound and the activator complex described by claim 9.

32. A process for polymerizing olefin(s) comprising contacting one or more olefin(s) with a catalyst system comprising a catalyst compound and the activator complex described by claim 18.

* * * * *